(12) United States Patent
O'Lenick et al.

(10) Patent No.: US 7,718,750 B2
(45) Date of Patent: May 18, 2010

(54) MULTI ALKOXYLATED SILICONE SURFACTANTS

(75) Inventors: Kevin Anthony O'Lenick, Dacula, GA (US); Anthony J. O'Lenick, Jr., Dacula, GA (US)

(73) Assignee: Siltech LLC, Dacula, GA (US)

( * ) Notice: Subject to any disclaimer, the term of this patent is extended or adjusted under 35 U.S.C. 154(b) by 93 days.

(21) Appl. No.: 12/157,948

(22) Filed: Jun. 16, 2008

(65) Prior Publication Data

US 2009/0299025 A1 Dec. 3, 2009

Related U.S. Application Data

(60) Provisional application No. 61/128,798, filed on May 27, 2008.

(51) Int. Cl.
C08G 77/04 (2006.01)
(52) U.S. Cl. .......................................... 528/25; 528/10
(58) Field of Classification Search .................. 528/10, 528/25
See application file for complete search history.

(56) References Cited

U.S. PATENT DOCUMENTS

| | | | | | |
|---|---|---|---|---|---|
| 3,398,104 | A | * | 8/1968 | Haluska | ........................ 521/112 |
| 3,629,308 | A | * | 12/1971 | Bailey et al. | ................. 556/445 |
| 4,047,958 | A | * | 9/1977 | Yoneyama et al. | ........... 430/527 |
| 4,698,178 | A | * | 10/1987 | Huttinger et al. | ............... 516/23 |
| 4,814,409 | A | * | 3/1989 | Blevins et al. | ................. 528/25 |
| 5,104,998 | A | * | 4/1992 | Ichinohe | ........................ 556/445 |
| 5,274,156 | A | * | 12/1993 | LeGrow et al. | .............. 556/445 |
| 5,446,114 | A | * | 8/1995 | O'Lenick, Jr. | ................ 528/15 |
| 5,472,987 | A | * | 12/1995 | Reedy et al. | ................. 521/106 |
| 5,871,720 | A | * | 2/1999 | Gutierrez et al. | .............. 424/65 |
| 5,955,003 | A | * | 9/1999 | Terren et al. | ................. 424/401 |
| 6,045,782 | A | * | 4/2000 | Krog et al. | ..................... 424/64 |
| 6,071,977 | A | * | 6/2000 | Austin et al. | ................. 521/112 |
| 6,117,963 | A | * | 9/2000 | Boinowitz et al. | ............ 528/25 |
| 6,265,456 | B1 | * | 7/2001 | Austin et al. | ................. 521/112 |
| 6,437,162 | B1 | * | 8/2002 | O'Lenick, Jr. | ............... 556/445 |
| 6,730,749 | B1 | * | 5/2004 | Burkhart et al. | .............. 525/474 |
| 6,803,407 | B2 | * | 10/2004 | Chrobaczek et al. | ......... 524/588 |
| 7,279,503 | B1 | | 10/2007 | O'Lenick | |
| 7,294,653 | B2 | * | 11/2007 | Zeng | ........................... 516/124 |
| 7,495,062 | B1 | * | 2/2009 | O'Lenick, Jr. | ................ 528/26 |
| 2001/0004646 | A1 | * | 6/2001 | Burkhart et al. | ............. 521/110 |
| 2003/0203984 | A1 | * | 10/2003 | Hilker et al. | ................. 521/155 |
| 2004/0132951 | A1 | * | 7/2004 | Burkhart et al. | ............... 528/29 |
| 2005/0031560 | A9 | * | 2/2005 | Simonnet et al. | .............. 424/63 |
| 2005/0131090 | A1 | * | 6/2005 | Furlan et al. | .................. 521/50 |
| 2006/0239948 | A1 | * | 10/2006 | LaVay et al. | ............... 424/70.7 |
| 2007/0065378 | A1 | * | 3/2007 | Vondruska et al. | ............ 424/59 |
| 2007/0203311 | A1 | * | 8/2007 | Roy et al. | ................. 526/238.2 |

FOREIGN PATENT DOCUMENTS

JP 2000313808 A * 11/2000

OTHER PUBLICATIONS

Machine translation of JP 2000-313808, 10 pages.*

* cited by examiner

*Primary Examiner*—Randy Gulakowski
*Assistant Examiner*—Robert Loewe

(57) ABSTRACT

The present invention is directed to organo-silicone compound that have alkoxylated allyl alcohol groups of different degree of ethylene oxide and or propylene oxide present on two or more different groups. It is also directed to the use of that compound in personal care and other applications. These compounds by virtue of their unique structure provide outstanding emulsions including microemulsions.

11 Claims, No Drawings

MULTI ALKOXYLATED SILICONE SURFACTANTS

RELATED APPLICATIONS

This application claims priority to and benefit of U.S. Provisional Application No. 61/128,798 filed May 27, 2008, the disclosure of which is incorporated herein for all purposes.

FIELD OF THE INVENTION

The present invention is directed to organo-silicone compound that have alkoxylated allyl alcohol groups of different degree of ethylene oxide and or propylene oxide present on two or more different groups. It is also directed to the use of that compound in personal care and other applications. These compounds by virtue of their unique structure provide outstanding emulsions including microemulsions.

BACKGROUND OF THE INVENTION

Organofunctional silicone compounds are one of two types, internal and terminal depending upon the location of the silicone group.

The so-called terminal group has the organic functional groups at the alpha and omega terminus of the molecule. Typical; of this class of compounds is the class of compounds currently called bis-dimethicone conforming to the following structure:

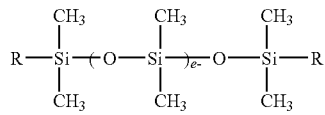

In the case where R is —(CH$_2$)$_3$—O—(CH$_2$CH$_2$O)$_8$H the compound is bis PEG-8 dimethicone.

The other type of compound is referred to as comb structure in which the organofunctionality is located on non-terminal ends of the molecule. This type of compound is called a "comb" compound since the organofunctionality lies in the molecule much like the teeth of a comb. These compounds are shown in the following structure:

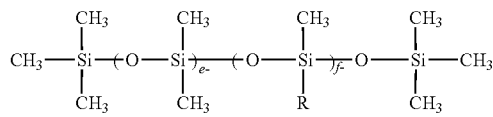

In the case where R is —(CH$_2$)$_3$—O—(CH$_2$CH$_2$O)$_8$H the compound is simply PEG-8 dimethicone.

The present invention is directed to compounds in of the comb type having two different "R" groups. Such compounds have been disclosed in the so-called comb alkyl dimethicone copolyol class.

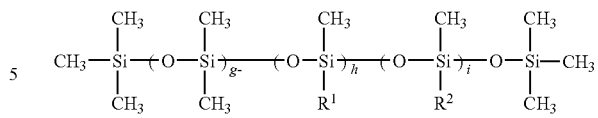

In the case where $R^1$ is —(CH$_2$)$_3$—O—(CH$_2$CH$_2$O)$_8$H and $R^2$ is —(CH$_2$)$_{11}$—CH$_3$ the compound is lauryl PEG-8 dimethicone. Such compounds are known and U.S. Pat. No. 7,279,503 to O'Lenick, incorporated herein by reference, is typical of patents related to such compounds. These compounds have two different types of compounds present on the molecule, in this case alkyl and alkoxylated.

We have surprisingly found that when two different level of alkoxylation are placed on one molecule the surfactant properties of the resulting emulsifier can be improved. None of the prior art known to us disclose such a compound.

THE INVENTION

Object of the Invention

The object present invention a series of silicone polymers containing two different alkoxylated groups on the same molecule together. These materials have outstanding surfactant properties and are therefore useful in personal care applications. Other objects will become clear by reading the specification.

DETAILED DESCRIPTION OF THE INVENTION

The compounds of the present invention conform to the following structure:

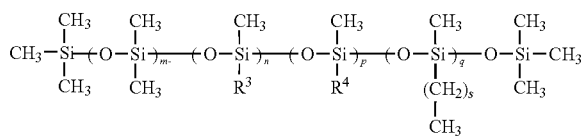

wherein;

$R^3$ is —(CH$_2$)$_3$—O—(CH$_2$CH$_2$O)$_x$—(CH$_2$CH(CH$_3$)O)$_y$—(CH$_2$CH$_2$O)$_z$H;

$R^4$ is —(CH$_2$)$_3$—O—(CH$_2$CH$_2$O)$_t$—(CH$_2$CH(CH$_3$)O)$_u$—(CH$_2$CH$_2$O)$_v$H;

s is an integer ranging from 11 to 25;

x, y and z are independently integers ranging from 0 to 20;

t, u, and v are independently integers ranging from 0 to 20, with the proviso x does not equal t, and y does not equal u and z does not equal v (that is that the alkoxylate groups are not identical)

m is an integer ranging from 0 to 200;

n is an integer ranging from 1 to 20;

p is an integer ranging from 1 to 20;

q is an integer ranging from 0 to 20.

The compounds of the present invention are prepared by the reaction of a silanic hydrogen containing silicone polymer conforming to the following structure:

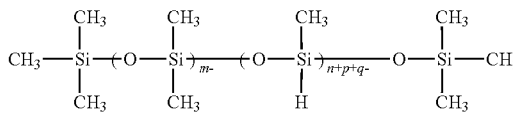

wherein:

and an "q" moles of alpha olefinic containing polymer selected from the group consisting of:

$$CH_2=CH-(CH_2)_{s-2}-CH_3;$$

"n" moles of the first alkoxylate conforming to the following structure:

$$CH_2=CH-CH_2-O-(CH_2CH_2O)_x-(CH_2CH(CH_3)-O)_y-(CH_2CH_2O)_z-H$$

and

"p" moles of the first alkoxylate conforming to the following structure:

$$CH_2=CH-CH_2-O-(CH_2CH_2O)_t-(CH_2CH(CH_3)-O)_u-(CH_2CH_2O)_v-H$$

s is an integer ranging from 11 to 25;
t, u and v are independently integers ranging from 0 to 20;
x, y, and z are independently integers ranging from 0 to 5, with the proviso x+y+z is less than or equal to 5 and t+u+v are greater than or equal to 10;
m is an integer ranging from 0 to 200;
n is an integer ranging from 1 to 20;
p is an integer ranging from 1 to 20;
q is an integer ranging from 0 to 20.

Preferred Embodiment

In a preferred embodiment x+y+z is zero and t+u+v is equal to or greater than 10.

In a preferred embodiment x+y+z are less than 5 and t+u+v is equal to or greater than 10.

In a preferred embodiment q is zero and x+y+z is zero and t+u+v is equal to or greater than 10.

In a preferred embodiment q is 1 or greater embodiment x+y+z are less than 5 and t+u+v is equal to or greater than 10.

In a preferred embodiment q is zero and x+y+z is zero and t+u+v is equal to or greater than 10 and s is less than or equal to 7.

In a preferred embodiment q is 1 or greater embodiment x+y+z are less than 5 and t+u+v is equal to or greater than 10 and s is less than or equal to 17.

In a preferred embodiment q is zero and x+y+z is zero and t+u+v is equal to or greater than 10 and s is greater than or equal to 19.

In a preferred embodiment q is 1 or greater embodiment x+y+z are less than 5 t+u+v is equal to or greater than 10 and s is greater than or equal to 19.

EXAMPLES

Silanic Hydrogen Compounds

Silanic hydrogen compounds conform to the following structure:

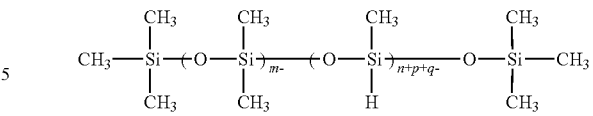

wherein;
m is an integer ranging from 0 to 200;
n is an integer ranging from 1 to 20;
p is an integer ranging from 1 to 20;
q is an integer ranging from 0 to 20.

They are commercially available from Siltech LLC of Dacula, Ga. The specific values reported below for the molecule were determined by Si-29 nmr.

| Example | m | n | p | q | n + p + q |
|---|---|---|---|---|---|
| 1 | 0 | 1 | 5 | 1 | 7 |
| 2 | 4 | 5 | 1 | 5 | 11 |
| 3 | 10 | 4 | 10 | 0 | 14 |
| 4 | 20 | 3 | 10 | 10 | 23 |
| 5 | 40 | 10 | 20 | 10 | 40 |
| 6 | 50 | 20 | 5 | 5 | 30 |
| 7 | 15 | 5 | 2 | 20 | 27 |
| 8 | 20 | 15 | 15 | 6 | 36 |
| 9 | 100 | 20 | 5 | 1 | 26 |
| 10 | 200 | 20 | 20 | 0 | 40 |

Olefinic Compounds

Alpha olefins are commercially available form a variety of sources including Chevron. They conform to the following structure:

$$CH_2=CH-(CH_2)_{s-2}-CH_3;$$

| Example | s |
|---|---|
| 11 | 9 |
| 12 | 11 |
| 13 | 23 |
| 14 | 20 |
| 15 | 25 |

Allyl Alcohol Alkoxylates
Class 1

Allyl alcohol alkoxylates are commercially available from several sources including Dow Chemical, Ethox Chemical, Siltech Corporation and KAO Chemical. They conform to the following structure:

$$CH_2=CH-CH_2-O-(CH_2CH_2O)_x-(CH_2CH(CH_3)-O)_y-(CH_2CH_2O)_z-H$$

x, y, and z are independently integers ranging from 0 to 5, with the proviso x+y+z is less than or equal to 5.

| Example | x | y | z |
|---|---|---|---|
| 13 | 0 | 0 | 0 |
| 14 | 1 | 1 | 1 |
| 15 | 0 | 5 | 0 |
| 16 | 2 | 0 | 2 |
| 17 | 0 | 1 | 4 |

Class2

Likewise the allyl alcohol alkoxylates of class 2 are commercially available from several sources including Dow Chemical, Ethox Chemical, Siltech Corporation and KAO Chemical. They conform to the following structure

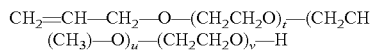

CH$_2$=CH—CH$_2$—O—(CH$_2$CH$_2$O)$_t$—(CH$_2$CH(CH$_3$)—O)$_u$—(CH$_2$CH$_2$O)$_v$—H t, u and v are independently integers ranging from 0 to 20 with the proviso t+u+v are than or equal to 10;

| Example | t  | u  | v  |
|---------|----|----|----|
| 18      | 20 | 20 | 20 |
| 19      | 0  | 10 | 0  |
| 20      | 10 | 0  | 0  |
| 21      | 5  | 3  | 5  |
| 22      | 20 | 2  | 5  |

PRODUCTS OF THE PRESENT INVENTION

General Procedure

The specified number of grams of allyl alcohol alkoxylates Class 1 (examples 13-17) and the specified number of grams of the specified allyl alcohol alkoxylate Class 2 (examples 18-20) are added to a vessel having agitation and cooling. Next the specified number of grams of silanic hydrogen (examples 1-10) and specified number of gram of alpha olefin (examples 11-16) is added, following by the specified number of grams of anhydrous isopropanol. The batch is then heated until the alpha olefin is liquid, or 80 C whichever is lower. Next 20 ppm Karnstedt catalyst (based upon the weight of all materials to be added) is added. Cooling is added to control the exotherm. It is not uncommon for the temperature to rise from 80 C to 90 C. Hold at 120 C for 4 hours, checking the Silanic hydrogen content until it becomes vanishing small. Distill off isopropanol using vacuum.

The formulation is:

| Emulsifier Formula | |
|---|---|
| Material | % |
| Water | 47.25 |
| Oil | 47.25 |
| Emulsifier | 5.00 |
| Salt | 0.5 |

Procedure:

1. Place emulsifier or emulsifier blend into the oil phase.
2. Mix well, noting clarity.
3. Add salt to water phase.
4. Heat both phases to 50° C.
5. Add water phase to oil phase and using mixer mix for 120 seconds.
6. Note appearance.

A comparison was made using the above formulation. The emulsions that were formed using the products containing a high and a low allyl allyl alcohol were more stable than those made with a molecule having the same number of moles of ethylene oxide and propylene oxide together in one allyl alcohol group. The presence of a high and a low amount of polyoxyalkylene in two different groups on the silicone polymer gives stability to emulsions made using the polymer over a silicone emulsifier in which there is one allyl alcohol alkoxylate with the same average number of moles of alkoxylate present. The conclusion is that two different allyl alcohol alkoxylates, one with a high amount of EO/PO and the other with a low amount of EO/PO will give surprisingly different surfactant properties than if the molecule made with the same average content on one molecule. While not wanting to be held to one reason for this it appears that the allyl alcohol portion with the low degree of alkoxylation (EO/PO) is a low HLB material and the portion with a high degree of alkoxy-

|         | Silanic Hydrogen | | Alkoxylate 1 | | Alkoxylate 2 | | Alpha Olefin | | Isopropanol |
|---------|---------|-------|---------|-------|---------|-------|---------|-------|-------|
| Example | Example | Grams | Example | Grams | Example | Grams | Example | Grams | Grams |
| 23 | 1  | 58  | 13 | 6   | 18 | 1500 | 11 | 14  | 20  |
| 24 | 2  | 112 | 14 | 103 | 19 | 65   | 12 | 84  | 88  |
| 25 | 3  | 174 | 15 | 141 | 20 | 500  | 13 | 0   | 163 |
| 26 | 4  | 302 | 16 | 70  | 21 | 675  | 14 | 280 | 265 |
| 27 | 5  | 664 | 17 | 294 | 22 | 2556 | 15 | 364 | 776 |
| 28 | 6  | 566 | 13 | 118 | 18 | 1500 | 11 | 70  | 460 |
| 29 | 7  | 289 | 14 | 100 | 19 | 130  | 12 | 336 | 200 |
| 30 | 8  | 380 | 15 | 528 | 21 | 748  | 13 | 202 | 400 |
| 31 | 9  | 912 | 16 | 470 | 22 | 337  | 14 | 28  | 450 |
| 32 | 10 | 173 | 17 | 588 | 18 | 2556 | 15 | 0   | 610 |

Emulsion Formulation

The first set of experiments are conducted using all four emulsifiers, and allow the formulator not only the ability to evaluate emulsion stability, but also cosmetic aesthetics.

lation (EO/PO) is a high HLB material and that putting the two in one molecule a particularly potent intra-molecular HLB pair emulsifier results.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

The invention claimed is:

1. A silicone polymer conforming to the following structure:

$$CH_3-Si(CH_3)_2-(O-Si(CH_3)_2)_m-(O-Si(CH_3)(R^3))_n-(O-Si(CH_3)(R^4))_p-(O-Si(CH_3)((CH_2)_sCH_3))_q-O-Si(CH_3)_3$$

wherein;

$R^3$ is $-(CH_2)_3-O-(CH_2CH_2O)_x-(CH_2CH(CH_3)O)_y-(CH_2CH_2O)_z-H$;

$R^4$ is $-(CH_2)_3-O-(CH_2CH_2O)_t-(CH_2CH(CH_3)O)_u-(CH_2CH_2O)_v-H$;

s is an integer ranging from 11 to 25;

x, y and z are independently integers ranging from 0 to 20;

t, u, and v are independently integers ranging from 0 to 20, with the proviso x does not equal t, and y does not equal u and z does not equal v (that is that the alkoxylate groups are not identical)

m is an integer ranging from 0 to 200;

n is an integer ranging from 1 to 20;

p is an integer ranging from 1 to 20;

q is an integer ranging from 1 to 20.

2. A silicone compound of claim 1 wherein x+y+z is zero and t+u+v is equal to or greater than 10.

3. A silicone compound of claim 1 wherein x+y+z are less than 5 and t+u+v is equal to or greater than 10.

4. A silicone compound of claim 1 wherein q is 1 or greater and x+y+z are less than 5 and t+u+v is equal to or greater than 10.

5. A silicone compound of claim 1 wherein q is 1 or greater and x+y+z are less than 5 and t+u+v is equal to or greater than 10 and s is less than or equal to 17.

6. A silicone compound of claim 1 wherein q is 1 or greater and x+y+z are less than 5 and t+u+v is equal to or greater than 10 and s is greater than or equal to 19.

7. A silicone compound prepared by the reaction of (a) a silanic hydrogen containing silicone polymer conforming to the following structure:

$$CH_3-Si(CH_3)_2-(O-Si(CH_3)_2)_m-(O-Si(CH_3)_2)_{n+p+q}-O-Si(CH_3)_3$$

(with H on the Si in the n+p+q block)

wherein:

with (b) q moles of alpha olefinic containing polymer selected from the group consisting of:

$CH_2=CH-(CH_2)_{s-2}-CH_3$;

(c) n moles of the first alkoxylate conforming to the following structure:

$CH_2=CH-CH_2-O-(CH_2CH_2O)_x-(CH_2CH(CH_3)-O)_y-(CH_2CH_2O)_z-H$;

and (d) "p" moles of the first alkoxylate conforming to the following structure:

$CH_2=CH-CH_2-O-(CH_2CH_2O)_t-(CH_2CH(CH_3)-O)_u-(CH_2CH_2O)_v-H$;

s is an integer ranging from 11 to 25;

t, u and v are independently integers ranging from 0 to 20;

x, y, and z are independently integers ranging from 0 to 5, with the proviso x+y+z is less than or equal to 5 and t+u+v are greater than or equal to 10;

m is an integer ranging from 0 to 200;

n is an integer ranging from 1 to 20;

p is an integer ranging from 1 to 20;

q is an integer ranging from 1 to 20.

8. A silicone compound of claim 7 wherein x+y+z is zero and t+u+v is equal to or greater than 10.

9. A silicone compound of claim 7 wherein x+y+z are less than 5 and t+u+v is equal to or greater than 10.

10. A silicone compound of claim 7 wherein q is 1 or greater and x+y+z are less than 5 and t+u+v is equal to or greater than 10.

11. A silicone compound of claim 7 wherein q is 1 or greater and x+y+z are less than 5 and t+u+v is equal to or greater than 10 and s is less than or equal to 17.

\* \* \* \* \*